United States Patent [19]
Ozaki

[11] Patent Number: 5,859,732
[45] Date of Patent: Jan. 12, 1999

[54] OPTICAL MEMBER COUPLING APPARATUS

[75] Inventor: Takao Ozaki, Omiya, Japan

[73] Assignee: Fuji Photo Optical Co. Ltd., Omiya, Japan

[21] Appl. No.: 971,326

[22] Filed: Nov. 17, 1997

[30] Foreign Application Priority Data

Dec. 13, 1996 [JP] Japan ................................. 8-353012

[51] Int. Cl.$^6$ ..................................................... G02B 7/02
[52] U.S. Cl. ......................... 359/822; 359/813; 359/819; 359/833; 359/554
[58] Field of Search ..................... 359/813, 822, 359/826, 831, 833, 618, 639, 640, 557, 819, 554

[56] References Cited

U.S. PATENT DOCUMENTS

| | | | |
|---|---|---|---|
| 3,588,230 | 6/1971 | De Rieux | 359/822 |
| 5,526,192 | 6/1996 | Imura et al. | 359/813 |
| 5,570,231 | 10/1996 | Mogamiya | 359/640 |
| 5,748,391 | 5/1998 | Tanaka et al. | 359/813 |
| 5,757,561 | 5/1998 | Sechrist et al. | 359/822 |
| 5,768,036 | 6/1998 | Nakagishi et al. | 359/813 |
| 5,774,266 | 6/1998 | Otani et al. | 359/554 |

Primary Examiner—Loha Ben
Attorney, Agent, or Firm—Ronald R. Snider

[57] ABSTRACT

In an optical member coupling apparatus for coupling an exchangeable lens unit and an optical member such as a color-separating prism with each other, a supporting section for movably supporting the optical member in a plane perpendicular to the optical axis is provided, whereby even when the optical axes of the lens unit and optical member deviate from each other, they can be adjusted easily. A color-separating prism 2 is attached, together with a lens unit 1, to a panel 3 by means of first and second bases 7 and 8 which are respectively movable only along X and Y axes in a plane perpendicular to the optical axis. The first and second bases 7 and 8 respectively have elliptical holes 7G and 8G into which a joystick 16 can be inserted. When the optical axis of the lens unit deviates from the imaging center of a CCD attached to the color-separating prism 2, screws 10A to 11B are unfastened, and the joystick 16 is inserted through the tool-inserting holes 7G and 8G and is wrenched so that the color-separating prism 2 is moved in a plane perpendicular to the optical axis.

4 Claims, 3 Drawing Sheets

OPTICAL MEMBER COUPLING APPARATUS

RELATED APPLICATIONS

This application claims the priority of Japanese Patent Application No. 8-353012 filed on Dec. 13, 1996, which is incorporated herein by reference.

BACKGROUND OF THE INVENTION

1. Field of the Invention

The present invention relates to an apparatus for coupling an optical member, such as color-separating prism, with a lens unit.

2. Description of the Prior Art

In broadcasting television cameras and the like, a zoom lens is often used as their taking lens. This zoom lens is attached to the main body of an optical apparatus (camera main body) as a zoom lens unit comprising a lens mount in which the zoom lens is accommodated. In order to selectively use various kinds of zoom lenses depending on states of taking, a lens mount structure configured so as to detachably attach the lens unit to the main body is widely employed as well.

Used in such a lens mount structure is an optical member coupling apparatus in which a mechanism for detachably holding the lens unit is attached to one surface of a flat panel, while a color-separating prism for separating an incident luminous flux into three primary color light components of R (red), G (green), and B (blue) is attached to the other surface. In order to couple the lens unit and the color-separating prism together by means of such an optical member coupling apparatus, the color-separating prism is initially secured to the panel, then a reference lens having a fixed reference distance between its mounting surface and the imaging surface of a CCD disposed downstream the color-separating prism is attached to the panel, and thereafter the CCD is attached to the rear end face of the color-separating prism so that the optical axis of the reference lens aligns with the imaging center.

Though the CCD is attached such that its imaging center aligns with the optical axis of the reference lens; when various kinds of lens units are exchanged for use as mentioned above, the optical axis of the lens unit and the imaging center of the CCD may deviate from each other due to an error in designing or the like. When the optical axis of the lens unit and the imaging center of the CCD thus deviate from each other, pictures taken by the CCD may erroneously shift.

SUMMARY OF THE INVENTION

In view of such circumstances, it is an object of the present invention to provide an optical member coupling apparatus which can easily and securely correct deviations between the optical axis of the lens unit and the imaging center on an imaging device such as CCD.

The present invention provides an optical member coupling apparatus for coupling an exchangeable lens unit with an optical member, the optical member comprising a supporting section for movably supporting the optical member within a plane perpendicular to an optical axis of the optical member, the supporting section comprising:

a panel having two surfaces perpendicular to the optical axis and supporting the lens unit within a plane of one of the two surfaces;

a first base section supported so as to be slidable in one direction within the other surface of the panel; and a second base section supported on an upper surface of the first base section substantially in parallel with the other surface so as to be slidable in a direction substantially orthogonal to the one direction, the optical member being attached to the second base section.

Specifically, the supporting section may be configured such that, for example, the optical member is attached to the panel as the first and second base sections are screwed onto the panel.

In this case, when each of the first and second base sections has a tool-inserting hole for minutely adjusting and moving the optical member with respect to the lens unit in a plane perpendicular to the optical axis before the first and second base sections are fastened by the screwing, the optical axes of the lens unit and optical member can be aligned with each other by use of the too-inserting holes.

Preferably, each of the tool-inserting holes is an elongated hole, and a major axis of the elongated hole formed in the first base section and a major axis of the elongated hole formed in the second base section are substantially orthogonal to each other.

DESCRIPTION OF THE PREFERRED EMBODIMENTS

In the following, embodiments of the present invention will be explained with reference to the accompanying drawings.

Figure 1:
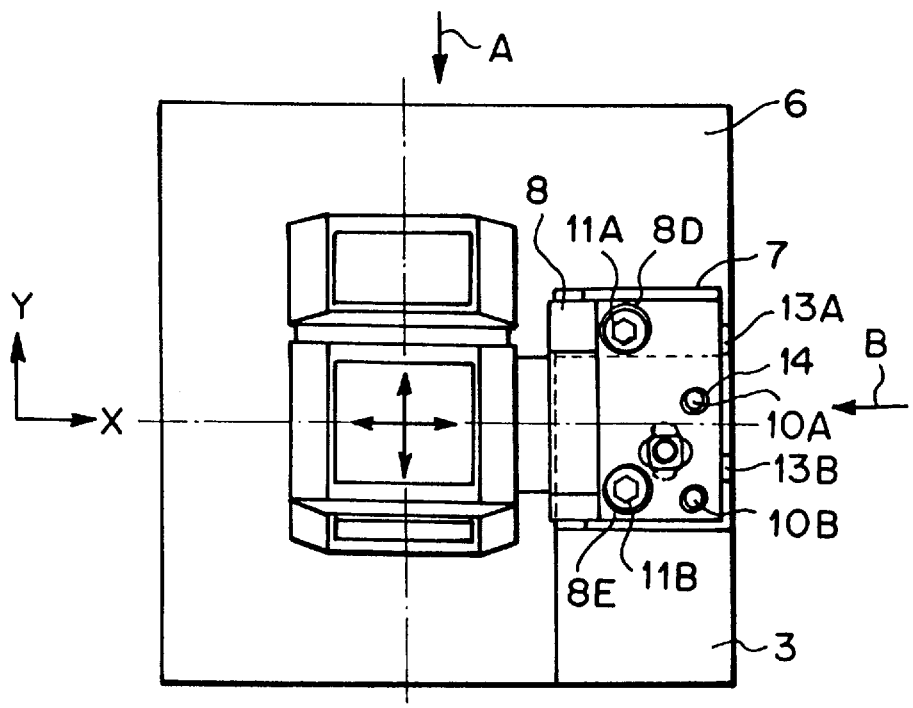
FIG. 1 is a plan view showing a configuration of an optical member coupling apparatus in accordance with an embodiment of the present invention.
Figure 2:
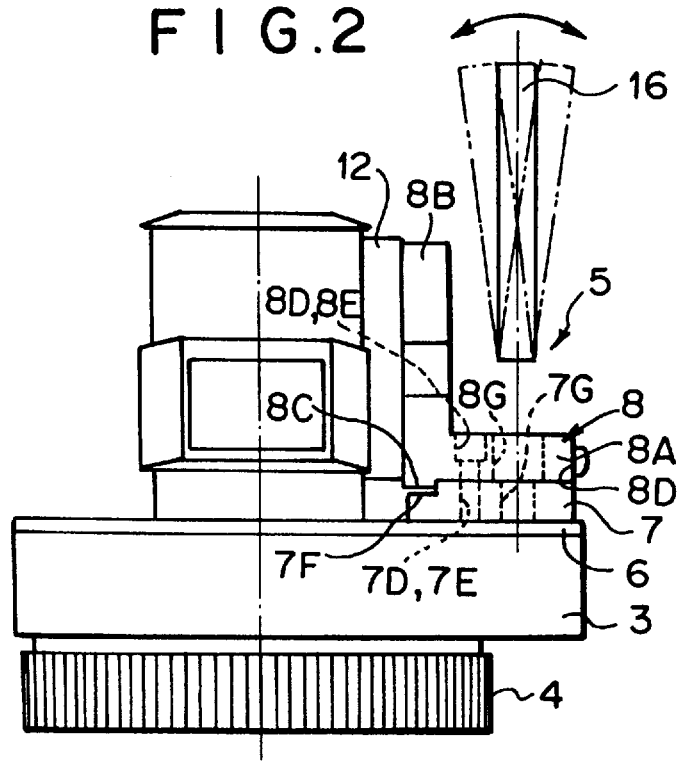
FIG. 2 is a view observed in the direction of arrow A in FIG. 1.

FIG. 1 is a plan view showing an optical member coupling apparatus in accordance with an embodiment of the present invention; FIG. 2 is a view observed in the direction of A in FIG. 1; and FIG. 3 is a view observed in the direction of arrow B in FIG. 1.

As shown in these drawings, the optical member coupling apparatus in accordance with this embodiment is an apparatus for coupling a reference lens or a zoom lens unit 1 (which may also be referred to as "reference lens 1" hereinafter) with a three-color-separating prism 2. The color-separating prism 2 is constituted by a first prism 21 for guiding a green color component to a green color CCD 31, a second prism 22 for guiding a blue color component to a blue color CCD 32, and a third prism 23 for guiding a red color component to a red color CCD 33.

Figure 3:
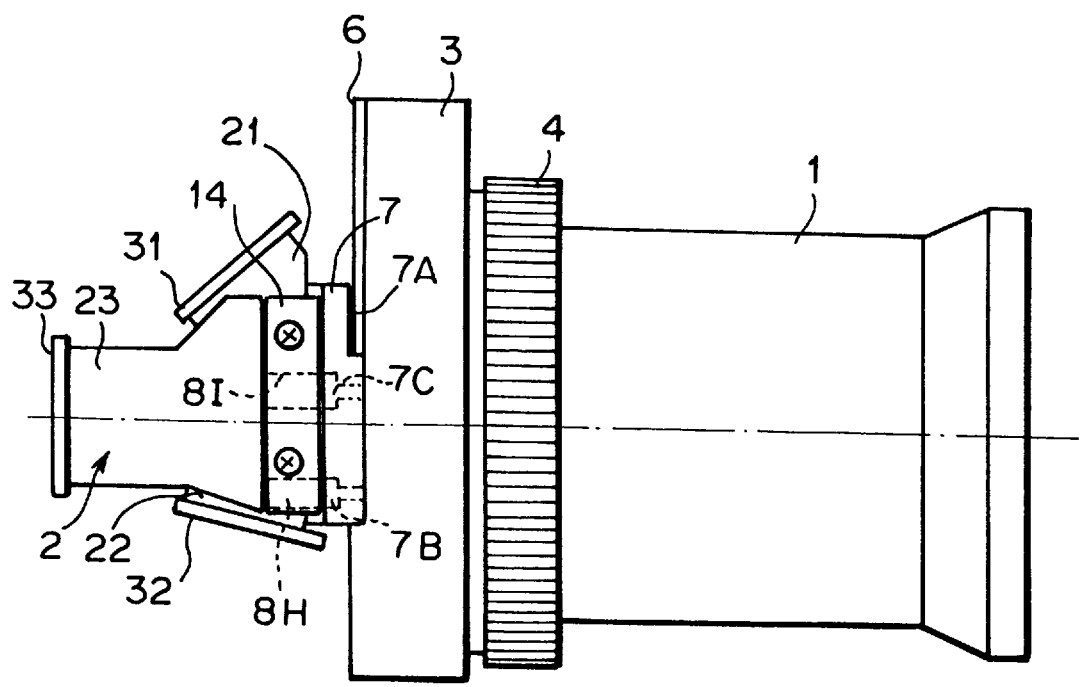
FIG. 3 is a view observed in the direction of arrow B in FIG. 1.
Figure 4:
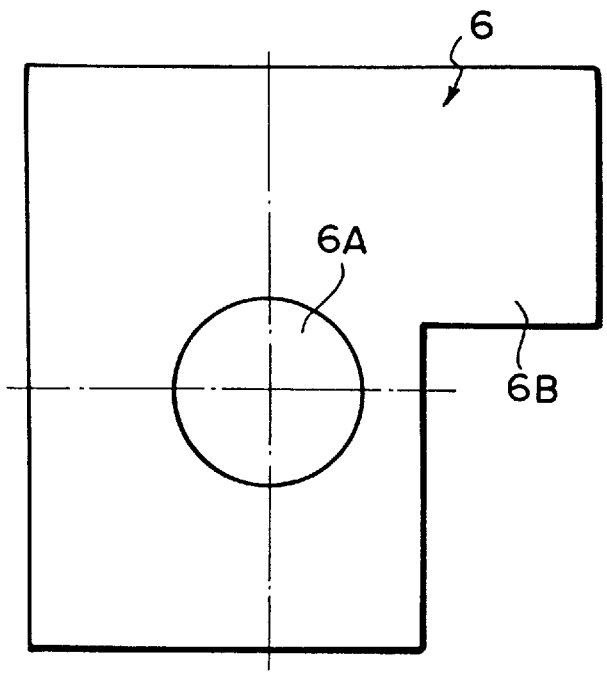
FIG. 4 is a view showing a configuration of a cover shown in FIG. 1.

As shown in FIGS. 1 to 3, the optical member coupling apparatus in accordance with this embodiment comprises a flat panel 3 having two surfaces in parallel to each other, one of which is provided with a mount mechanism 4 for detachably holding the lens unit 1. Attached to the other surface of the panel 3, together with a cover 6 having a form shown in FIG. 4, is a supporting section 5 for securing the color-separating prism 2. As depicted in FIG. 4, the cover 6 has a hole 6A for inserting the color-separating prism 2 therein and a sliding section 6B onto which a first base 7 slidably abuts as explained in the following.

The supporting section 5 comprises the first base 7 and a second base 8. The first base 7 has a cutout portion 7A at its bottom face, and a step portion 7F on its upper face. When the first base 7 is attached to the panel 3, the cutout portion 7A slidably abuts to the sliding section 6B of the cover 6, whereby the first base 7 can slide with respect to the panel 3 along X axis in FIG. 1. Also formed in the first base 7 are screw-inserting holes 7B and 7C for respectively inserting therein hexagon socket head screws 10A and 10B for securing the first base 7 onto the panel 3, and screw-inserting holes 7D and 7E for respectively inserting therein hexagon socket head screws 11A and 11B for securing the second base 8 onto the panel 3. These screw-inserting holes 7B, 7C, 7D, and 7E each have diameters greater than those of their corresponding hexagon socket head screws 10A, 10B, 11A, and 11B. Further formed in the first base 7 is an elliptical tool-inserting hole 7G having a major axis extending along Y axis in FIG. 1.

As shown in FIG. 2, the second base 8 is constituted by a bottom portion 8A and a rising portion 8B so as to form an L-shaped cross section, while the bottom face of the bottom portion 8A is formed with a protrusion 8C which engages with the step portion 7F of the first base 7. To an end face 8D of the bottom portion 8A which is opposite to the side provided with the protrusion 8C, a leaf spring 14 is attached by means of screws 13A and 13B. The second base 8 is mounted on the first base 7 such that the upper part of the first base 7 is held between the protrusion 8C and the leaf spring 14. Consequently, the second base 8 is made slidable with respect to the first base 7 along Y axis in FIG. 1.

The color-separating prism 2 is bonded to the rising portion 8B of the second base 8, with a pedestal 12 interposed therebetween, by an adhesive. Also formed in the bottom portion 8A of the second base 8 are screw-inserting holes 8D and 8E for respectively inserting therein the hexagon socket head screws 11A and 11B for securing the second base 8 onto the panel 3. These screw-inserting holes 8D and 8E have diameters greater than those of their corresponding hexagon socket head screws 11A and 11B. Formed at positions corresponding to the screw-inserting holes 7B and 7C of the first base 7 are insertion holes 8H and 8I for inserting therein hexagonal wrenches for fastening the hexagon socket head screws 10A and 10B, respectively.

Figure 5:
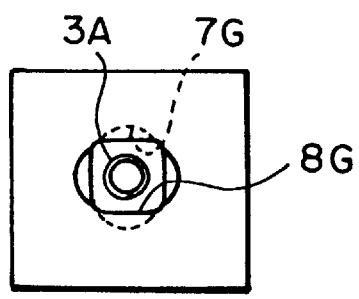
FIG. 5 is an enlarged view showing a configuration of an elongated hole shown in FIG. 1.

On the other hand, the bottom portion 8A of the second base 8 is formed with an elliptical tool-inserting hole 8G having a major axis along X axis in FIG. 1. When the second base 2 is attached to the first base 7, as shown in the enlarged view of FIG. 5, the major axes of the tool-inserting holes 7G and 8G become orthogonal to each other and interfere with each other at their center portions. In FIG. 5, a screw hole 3A formed in the panel 3 can be observed from the tool-inserting holes 7G and 8G. This screw hole 3A is used for screwing the color-separating prism 2 and the panel 3 together in order to prevent the color-separating prism 2, once adjusted in terms of optical axis, from deviating from the panel 3 when the camera is shipped.

The supporting section 5 is attached to the panel 3 as follows.

First, the color-separating prism 2 is attached to the rising portion 8B of the second base 8 with the pedestal 12 interposed therebetween. Then, the leaf spring 14 is secured to the end face 8D of the bottom portion 8A by means of the screws 13A and 13B.

Thereafter, the cover 6 is attached by an adhesive to the surface of the panel 3 opposite to the side provided with the mount mechanism 4. Subsequently, the hexagon socket head screws 10A and 10B are inserted into the screw-inserting holes 7B and 7C of the first base 7 so that the first base 7 is temporarily secured to the panel 3. Here, the cutout portion 7A of the first base 7 is caused to abut to the sliding section 6B of the cover 6. Then, the hexagon socket head screws 11A and 11B are inserted into the screw-inserting holes 8D and 8E of the second base 8 to which the color-separating prism 2 is attached, and further into the screw-inserting holes 7D and 7E of the first base 7, so that the second base 8 is temporarily secured to the panel 3 through the first base 7. Here, the step portion 7F of the first base 7 and the protrusion 8C of the second base 8 are caused to abut to each other. As a result, the upper part of the first base 7 is held between the protrusion 8C of the second base 8 and the leaf spring 14.

Subsequently, the reference lens 1 is attached to the mount mechanism 4, and the color-separating prism 2 is fixed to the panel 3 while the color-separating prism 2 is positioned such that the optical axis of the reference lens 1 and the optical axis of the color-separating prism 2 align with each other. Here, in order to align the optical axes with each other in regard to X axis, the first base 7 is pressed against and slid on the sliding section 6B of the cover 6, and after their positions align with each other in regard to X axis, the hexagon socket head screws 10A and 10B are fastened. As a result, the first base 7 is prevented from shifting along Y axis of the optical axes. In order to position the optical axes in regard to Y axis, on the other hand, after the positioning is effected in regard to X axis, the protrusion 8C of the second base 8 and the step portion 7F of the first base 7 are shifted while being slid against each other, and after their positions align with each other in regard to Y axis, the hexagon socket head screws 11A and 11B are fastened. Here, since the upper part of the first base 7 is held between the protrusion 8C and the leaf spring 14, the second base 8 is restrained from moving along X axis, while being allowed to move along Y axis alone. Accordingly, the second base 8 is prevented from shifting along X axis of the optical axes.

After the optical axes of the reference lens 1 and color-separating prism 2 are thus positioned with respect to each other, the CCDs 31, 32, and 33 are attached to light-emitting end faces of the first prism 21, second prism 22, and third prism 23 of the color-separating prism 2, respectively. Here, the imaging centers of the CCDs 31, 32, and 33 are caused to align with the optical axis of the color-separating prism 2.

As the color-separating prism 2 is thus attached to the panel 3, the optical axis of the reference lens 1 aligns with the imaging centers of the CCDs 31, 32, and 33.

On the other hand, in the case where various kinds of zoom lenses other than the reference lens 1 are exchangeably used as being attached to the mount mechanism 4, the optical axis of thus attached zoom lens may deviate from the imaging centers of the CCDs 31, 32, and 33. In this case, after the zoom lens is attached, the hexagon socket head screws 10A, 10B, 11A, and 11B are slightly unfastened, and a joystick 16 is inserted through the tool-inserting holes 7G and 8G, and wrenched as indicated by virtual lines in FIG. 2, so as to move the first base 7 and the second base 8 along X and Y axes with respect to a plane perpendicular to the optical axis, thus causing the optical axis of the zoom lens to align with the imaging centers of the CCDs 31, 32, and 33.

Namely, as the joystick 16 is inserted into the tool-inserting holes 7G and 8G such that its tip portion abuts to the panel 3, and is wrenched about the abutting portion along X axis, the first base 7 moves along X axis. Here, since the cutout portion 7A of the first base 7 abuts to and slides on the sliding section 6B of the cover 6 as mentioned above, the first base 7 is prevented from shifting along Y axis. When the joystick 16 is wrenched along Y axis about the abutting portion, on the other hand, the second base 8 moves along Y axis. Here, since the upper part of the first base 7 is held between the protrusion 8C and the leaf spring 14, the second base 8 is restrained from moving along X axis, whereby it does not shift along X axis.

After the joystick 16 is inserted into the tool-inserting holes 7G and 8G so as to move the first base 7 and the second base 8 such that the optical axis of the zoom lens aligns with the imaging centers of the CCDs 31, 32, and 33, the hexagon socket head screws 10A, 10B, 11A, and 11B are fastened to complete positioning.

As explained in the foregoing, in the optical member coupling apparatus of this embodiment, since the color-separating prism 2 is attached to the panel 3 by means of the first base 7, which is movable only along X direction, and the second base 8, which is movable only along Y direction, the color-separating prism 2 can be moved two-dimensionally in a plane perpendicular to the optical axis. Accordingly, even in the case where the optical axis of the zoom lens deviates from the imaging centers of the CCDs 10A, 10B, 11A, and 11B upon exchanging zoom lenses, they can be positioned with respect to each other by unfastening the hexagon socket head screws 10A, 10B, 11A, and 11B and moving the color-separating prism 2 along X and Y axes. Therefore, images formed on the CCDs 31, 32, and 33 can be prevented from shifting.

Also, in this embodiment, since the first base 7 and second base 8 are respectively formed with the elliptical tool-inserting holes 7G and 8G whose major axes are orthogonal to each other, the color-separating prism 2 can be moved two-dimensionally in a plane perpendicular to the optical axis, whereby the optical axis of the zoom lens can easily be positioned with respect to the imaging centers of the CCDs 31, 32, and 33.

Without being restricted to the above-mentioned embodiment, the optical member coupling apparatus of the present invention can be modified in various manners.

For example, the first base 7 and the second base 8 may be freely moved in a plane perpendicular to the optical axis without forming the cutout portion 7A and step portion 7F in the first base 7 and without forming the protrusion 8C in the second base 8.

Also, without the first base 7, a base configured similarly to the second base 8 may be attached to the panel 3, so as to be moved in a plane perpendicular to the optical axis.

Further, the tool-inserting holes 7G and 8G may be circular instead of being elliptical.

As explained in detail in the foregoing, in the optical member coupling apparatus of the present invention, since a supporting section for movably supporting an optical member within a plane perpendicular to its optical axis is provided, even in the case where the optical axis of a lens unit and the optical axis of the optical member deviate from each other upon exchanging lens units, the optical axis of the lens unit and the optical axis of the optical member can be caused to align with each other when the supporting section moves the optical member. Consequently, images incident on the optical member can be prevented from deviating from the optical axis. Also, this supporting section comprises a panel having two surfaces perpendicular to the optical axis and supporting the lens unit within a plane of one of the two surfaces; a first base section supported so as to be slidable in one direction within the other surface of the panel; and a second base section supported on an upper surface of the first base section substantially in parallel with the other surface so as to be slidable in a direction substantially orthogonal to the one direction, the optical member being attached to the second base section. Accordingly, the optical axis of the lens unit can easily and securely be positioned with respect to the optical axis of the optical member and, consequently, with respect to the imaging center of the imaging device.

Also, as the first and second base sections are formed with tool-inserting holes for moving the optical member with respect to the lens unit within a plane perpendicular to the optical axis, the optical member can be moved within a plane perpendicular to the optical axis by simply inserting a tool through the tool-inserting hole and wrenching the tool, whereby the optical axis can be adjusted easily.

Further, as the tool-inserting holes are formed as elongated holes, and the major axes of the elongated holes in the first and second base sections are made orthogonal to each other, it becomes easier to insert the tool therein and move the optical member.

What is claimed is:

1. An optical member coupling apparatus for coupling an exchangeable lens unit with an optical member, said optical member comprising a supporting section for movably supporting said optical member within a plane perpendicular to an optical axis of said optical member, said supporting section comprising:
a panel having two surfaces perpendicular to said optical axis and supporting said lens unit within a plane of one of said two surfaces;
a first base section supported so as to be slidable in one direction within the other surface of said panel; and
a second base section supported on an upper surface of said first base section substantially in parallel with the other surface so as to be slidable in a direction substantially orthogonal to said one direction, said optical member being attached to said second base section.

2. An optical member according to claim 1, wherein said optical member is attached to said panel as said first and second base sections are screwed onto said panel.

3. An optical member according to claim 2, wherein each of said first and second base sections has a tool-inserting hole for minutely adjusting and moving said optical member with respect to said lens unit in a plane perpendicular to said optical axis before said first and second base sections are fastened by screwing.

4. An optical member according to claim 3, wherein each of said tool-inserting holes is an elongated hole, and a major axis of the elongated hole formed in said first base section and a major axis of the elongated hole formed in said second base section are substantially orthogonal to each other.

* * * * *